US011752552B2

(12) United States Patent
Anton et al.

(10) Patent No.: US 11,752,552 B2
(45) Date of Patent: Sep. 12, 2023

(54) METHOD FOR MODIFYING COMPONENTS USING ADDITIVE MANUFACTURING

(71) Applicant: Siemens Energy Global GmbH & Co. KG, Munich (DE)

(72) Inventors: Reiner Anton, Berlin (DE); Uwe Galander, Berlin (DE); Kay Krabiell, Hohen Neuendorf (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 562 days.

(21) Appl. No.: 16/753,833

(22) PCT Filed: Oct. 9, 2018

(86) PCT No.: PCT/EP2018/077447
§ 371 (c)(1),
(2) Date: Apr. 6, 2020

(87) PCT Pub. No.: WO2019/081197
PCT Pub. Date: May 2, 2019

(65) Prior Publication Data
US 2020/0290123 A1 Sep. 17, 2020

(30) Foreign Application Priority Data
Oct. 27, 2017 (DE) .................... 10 2017 219 333.6

(51) Int. Cl.
*B28B 1/00* (2006.01)
*B22F 10/14* (2021.01)
(Continued)

(52) U.S. Cl.
CPC ............... *B22F 5/009* (2013.01); *B22F 1/10* (2022.01); *B22F 5/04* (2013.01); *B22F 7/062* (2013.01);
(Continued)

(58) Field of Classification Search
CPC .... B22F 10/20; B22F 1/10; B22F 5/04; B22F 7/062; B22F 10/30; B22F 2007/068;
(Continued)

(56) References Cited

U.S. PATENT DOCUMENTS

| 6,483,596 B1 | 11/2002 | Philippi et al. |
| 9,174,312 B2 | 11/2015 | Baughman et al. |
| 2011/0170977 A1* | 7/2011 | Vagt ........................ B22F 10/28 219/383 |
| 2012/0222306 A1* | 9/2012 | Mittendorf ............. B33Y 10/00 29/889.1 |

(Continued)

FOREIGN PATENT DOCUMENTS

| CN | 105102181 A | 11/2015 |
| CN | 105598445 A | 5/2016 |

(Continued)

OTHER PUBLICATIONS

PCT International Search Report and Written Opinion of International Searching Authority dated Jul. 1, 2019 corresponding PCT International Application No. PCT/EP2018/077447 filed Sep. 10, 2018.

*Primary Examiner* — John A Hevey

(57) ABSTRACT

A method for building structures on existing components includes preparing an auxiliary plate suitable for fastening on the working plate, wherein the auxiliary plate has at least one reference marking, fastening the component on the auxiliary plate, optionally processing the at least one surface to be processed for providing a surface that is substantially parallel to the working plane of the device, measuring the at least one reference marking and the component, wherein the position is recorded, introducing the auxiliary plate with the at least one reference marking and the component into the device and detachably fastening the auxiliary plate on the working plate and processing the component in the device for additive manufacturing by working data on the basis of measuring data. A device and a composite structure for additive manufacturing is used in the method.

13 Claims, 3 Drawing Sheets

(51) Int. Cl.
*B22F 10/28* (2021.01)
*B22F 10/31* (2021.01)
*B33Y 10/00* (2015.01)
*B33Y 30/00* (2015.01)
*B33Y 50/02* (2015.01)
*B22F 12/90* (2021.01)
*B22F 5/00* (2006.01)
*B22F 5/04* (2006.01)
*B22F 7/06* (2006.01)
*B22F 1/10* (2022.01)

(52) U.S. Cl.
CPC .............. *B22F 10/14* (2021.01); *B22F 10/28* (2021.01); *B22F 10/31* (2021.01); *B28B 1/001* (2013.01); *B22F 12/90* (2021.01); *B22F 2007/068* (2013.01); *B22F 2202/11* (2013.01); *B22F 2998/10* (2013.01); *B33Y 10/00* (2014.12); *B33Y 30/00* (2014.12); *B33Y 50/02* (2014.12)

(58) Field of Classification Search
CPC .. B22F 2202/11; B22F 2998/10; B22F 12/90; B22F 10/14; B22F 10/28; B22F 10/31; B22F 5/009; B22F 3/105; B28B 1/001; B33Y 10/00; B33Y 30/00; B33Y 50/02; B23Q 3/063; F05D 2230/22; F05D 2230/31; F05D 2230/72; F05D 2230/80; Y02P 10/25; B23P 6/007; F01D 5/005
See application file for complete search history.

(56) References Cited

U.S. PATENT DOCUMENTS

| | | |
|---|---|---|
| 2013/0001837 A1 | 1/2013 | Gohler et al. |
| 2014/0099476 A1 | 4/2014 | Subramanian et al. |
| 2014/0154088 A1 | 6/2014 | Etter et al. |
| 2015/0100149 A1 | 4/2015 | Coeck et al. |
| 2015/0367456 A1 | 12/2015 | Ozbaysal et al. |
| 2016/0067923 A1 | 3/2016 | James et al. |
| 2016/0250724 A1 | 9/2016 | Krol et al. |
| 2017/0333995 A1 | 11/2017 | Ott et al. |
| 2018/0099454 A1 * | 4/2018 | Hümmeler ............ B29C 64/165 |

FOREIGN PATENT DOCUMENTS

| | | | |
|---|---|---|---|
| CN | 105682900 A | 6/2016 | |
| CN | 106270501 A | 1/2017 | |
| CN | 107097036 A | 8/2017 | |
| CN | 107107192 A | 8/2017 | |
| DE | 10150129 C1 | 4/2003 | |
| DE | 102009033753 A1 | 1/2011 | |
| DE | 102009048665 A1 | 3/2011 | |
| DE | 102016204462 A1 | 10/2016 | |
| EP | 1048441 A1 | 11/2000 | |
| EP | 2700459 A1 | 2/2014 | |
| EP | 2737965 A1 | 6/2014 | |
| RU | 2566117 C2 | 10/2015 | |
| RU | 2574536 C2 | 2/2016 | |
| WO | 2016166337 A1 | 10/2016 | |
| WO | 2016173668 A1 | 11/2016 | |
| WO | WO-2016173668 A1 * | 11/2016 | ........... B29C 64/112 |

* cited by examiner

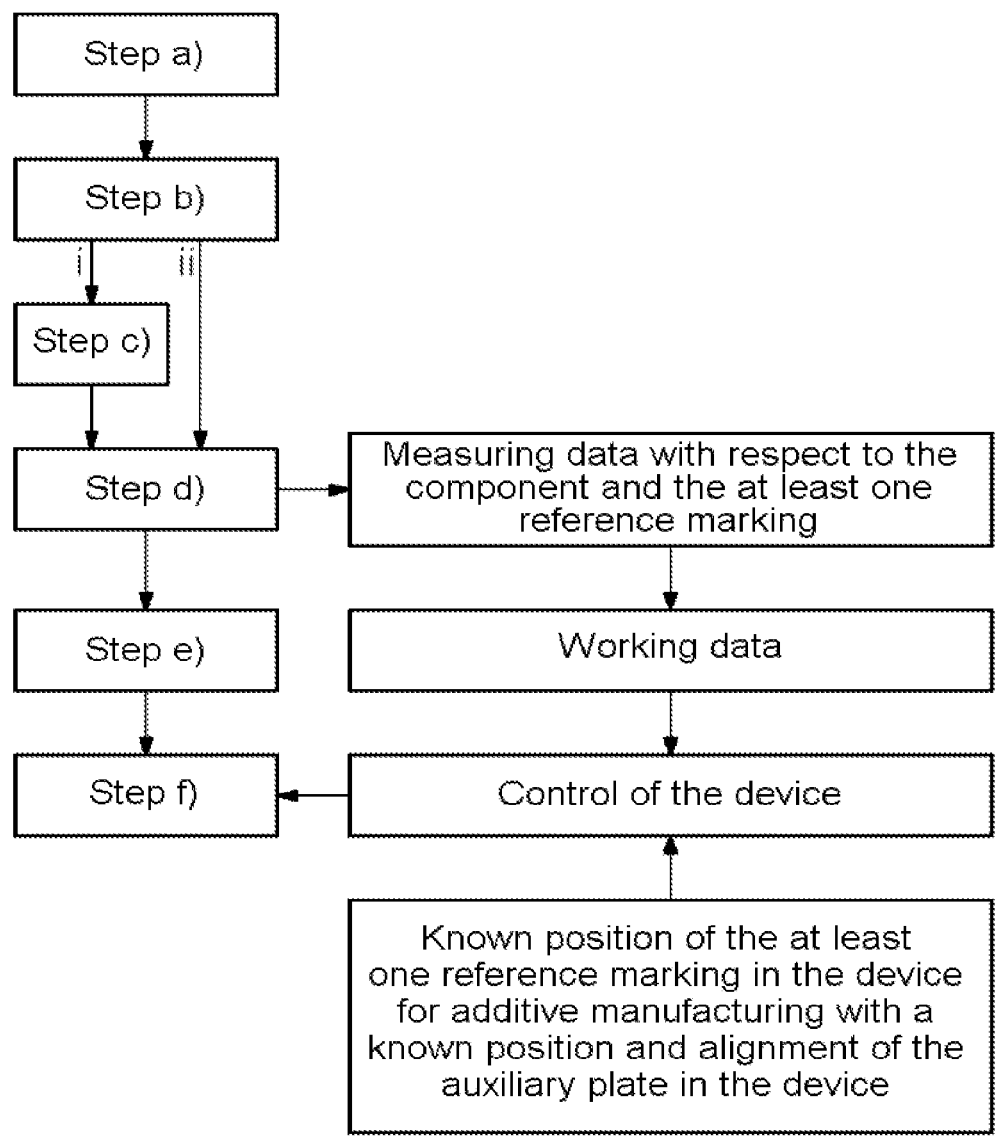

METHOD FOR MODIFYING COMPONENTS USING ADDITIVE MANUFACTURING

CROSS REFERENCE TO RELATED APPLICATIONS

This application is the U.S. National Stage of International Application No. PCT/EP2018/077447 filed 9 Oct. 2018, and claims the benefit thereof. The International Application claims the benefit of German Application No. DE 10 2017 219 333.6 filed 27 Oct. 2017. All of the applications are incorporated by reference herein in their entirety.

FIELD OF INVENTION

The present invention relates to the processing of existing components using devices for additive manufacturing. The present application also relates to a device for additive manufacturing for carrying out this method. The present invention also relates to a composite structure that is used in the method according to the invention.

BACKGROUND OF INVENTION

The additive manufacturing of components is known. For example, DE 10 2009 048 665 A1 concerns the production of a turbine blade in which a three-dimensionally extending lattice is contained in the interior. The interior space is surrounded by a wall, while holes which connect the interior space to a surface of the turbine blade can be provided in this wall. As disclosed for example by DE 10 2009 033 753 A1, such openings can be used for example to transport cooling gas from the interior space of the blade to its surface. In this way, film cooling of the blade with the cooling gas is possible.

Although additive manufacturing offers the possibility of flexibly creating components with a wide variety of geometries, building up the components layer by layer requires a considerable amount of time. At the same time, the powder used for this is very expensive because of the high quality requirements. Use for repairing or modifying existing components involves further problems.

For example, the additively manufactured structure is built up from a powder bed at a defined location of the space within the device for additive manufacturing. In order that an additively manufactured structure can be connected to an existing component already during the additive manufacturing, this component must be introduced into the powder bed and the building up of the structure must be begun there with great accuracy on the surface to be processed of the component. For this, it is however required for example that the position and alignment of the existing component are exactly known. High-precision alignment of the component in the installation is not always feasible however, because for example it is too inaccurate, and requires at least a considerable amount of time, during which the device for additive manufacturing cannot be used for production. Also, an actual component may for example deviate in its form from the theoretical reference data of its form. Since, unlike in the case of existing methods such as laser welding, it is not intended for a significant surplus of material to be applied, these deviations would also have to be included in the additive manufacturing. Otherwise, high-precision structures cannot be applied on the surface of the existing component without the structure that has been built up possibly having to be removed again after manufacturing and recreated because of the deviation.

Existing devices for additive manufacturing do not yet offer any solution in this respect, and so additive manufacturing in this area still cannot be used in addition to or instead of existing methods. In particular, it is not yet possible to use the special advantages of additive manufacturing, such as the possibility of carrying out a modification of an existing component in the sense of an upgrade by applying a newly created structure. In view of the inadequate possibilities, or at least in view of the complexity and the consequently resulting price, new manufacture of corresponding components is advantageous here. In particular, it would be advantageous to be able to easily retrofit existing installations in order to be able to use these resources.

Therefore, there is the need for an improved method that allows integration of additive manufacturing in current production technology, maintenance technology and repair technology, while it is intended that the least possible adaptations are made to existing devices for additive manufacturing. There is also a need for such modified devices and auxiliary means for implementing such a method. These objects and other objects not explicitly stated are achieved by the invention disclosed in the claims and the description and by the specific embodiments that are disclosed hereafter.

SUMMARY OF INVENTION

According to one aspect, the present invention relates to a method for the additive manufacturing of a structure on at least one surface to be processed of a component in a device for additive manufacturing, wherein the device for additive manufacturing has a working plate, comprising the following steps a) preparing an auxiliary plate suitable for fastening on the working plate, wherein the auxiliary plate has at least one reference marking, b) fastening the component on the auxiliary plate, advantageously wherein the at least one surface to be processed is upwardly directed, c) optionally processing the at least one surface to be processed for providing a surface that is substantially parallel to the working plane of the device for additive manufacturing, d) measuring the at least one reference marking and the component, wherein the position of the component with reference to the at least one reference marking is recorded, e) introducing the auxiliary plate with the at least one reference marking and the component into the device for additive manufacturing and detachably fastening the auxiliary plate on the working plate and f) processing the component in the device for additive manufacturing by means of working data on the basis of measuring data of step d). The term "upwardly" in the context of the present invention refers to an orientation in which the surface to be processed is facing away from the auxiliary plate.

The aforementioned steps take place here in the aforementioned sequence, while further intermediate steps that are mentioned hereafter or are not mentioned may also take place.

The present method makes it possible to use existing devices for additive manufacturing, in that a minimal alteration is made to the device and the measurement for determining the required data is relocated out of the device for additive manufacturing. Serving as a link between the reference system of the measuring device from step d) and the reference system of the device for additive manufacturing is the at least one reference marking(s), defined as a reference point for the reference system of the device. This makes it possible for the data obtained outside the device to be used in the device.

The term "reference marking" in the context of the present invention relates to a detectable marking of the auxiliary plate, which represents a known position in the device for additive manufacturing. Such reference markings may be produced for example by making the reference marking in the device for additive manufacturing, and so the data for the making of these reference points can be used to perform an assignment of the position in the device to the location of the reference marking on the auxiliary plate. Indentations on the surface of the auxiliary plate, surface modification of the auxiliary plate such as markings or bodies on the surface of the auxiliary plate may for example be used as reference markings.

According to a further aspect, the present invention relates to a device for additive manufacturing comprising a working plate and an auxiliary plate for carrying out the method according to the invention, wherein the working plate is suitable for detachably fastening the auxiliary plate on the working plate, and wherein the auxiliary plate has at least one reference marking and is suitable for being detachably connected to the working plate.

According to a further aspect, the present invention relates to a composite structure for use in a method according to the invention comprising—an auxiliary plate suitable for fastening on the working plate of the device for additive manufacturing, —at least one component for processing by means of additive manufacturing, wherein the component is fastened on the auxiliary plate, and—at least one reference marking which is fastened on the auxiliary plate, wherein the at least one reference marking is suitable for being used as a reference point for the positional determination of the at least one component.

For a more complete understanding of the present invention, reference is made to the following detailed description and the figures described in connection with it. However, the figures should only be understood here as illustrating the invention and only represent particularly advantageous embodiments and not a restriction of the invention.

BRIEF DESCRIPTION OF THE DRAWINGS

FIG. 5 shows a schematic sequence of a method that is also represented in FIGS. 1 and 2. This involves running through steps a) to f).

DETAILED DESCRIPTION OF INVENTION

Figure 1:
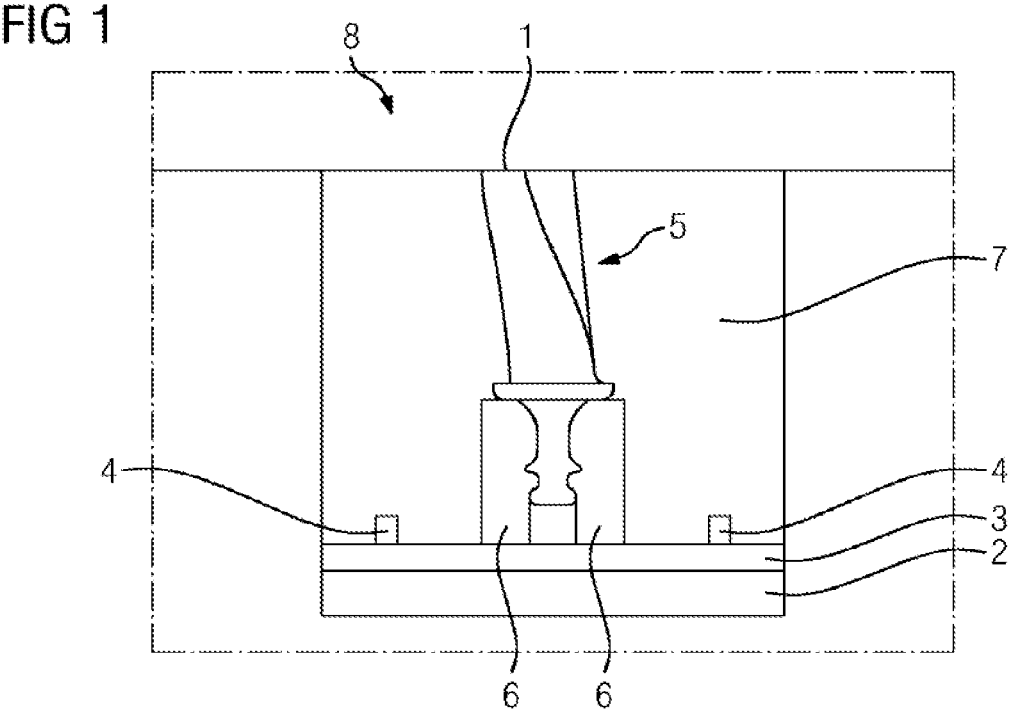
FIG. 1 shows the detail of a schematic side view from a device for additive manufacturing during step f) of the method.

According to one aspect, the present invention relates to the aforementioned method for the additive manufacturing of a structure on at least one surface to be processed of a component in a device for additive manufacturing.

This may for example involve the component being connected directly to the auxiliary plate or fastened on the auxiliary plate by means of fastening elements. This is advantageous in particular because it allows even components which for example have little base area for contact with the auxiliary plate to be fastened securely and firmly on the auxiliary plate. It also allows a component such as for example a turbine blade to be firmly clamped between a number of fastening elements. A detachable fastening of the component at possibly existing fastening elements is typically advantageous here. This means for example that there is no longer any need for a subsequent step for removing remains of a weld or the like as remains of an undetachable connection of the component and the auxiliary plate or the component and the fastening element. The fastening elements may in this case be fastened detachably or undetachably on the auxiliary plate. Advantageously, one fastening element, more advantageously a number of fastening elements, is/are detachably fastened on the auxiliary plate, for example screwed, in order to make quick and easy fastening of the fastening element possible. This not only makes it possible for the fastening elements to be quickly exchanged, but also for example the component to be quickly fastened, in particular by clamping in between a number of fastening elements without great technical complexity.

The working plate is advantageously a component that is detachably connected to the device for additive manufacturing and is suitable for fastening the auxiliary plate on it. This allows the working plate to be exchanged when the fastenings for the auxiliary plate are worn, and consequently make it possible for the auxiliary plate to be fastened with great accuracy for a sustained period of time, without any appreciable downtimes of the device.

It is also advantageous if the working plate is a component part of a platform that is suitable for applying the powder bed for the additive manufacturing to it and for being lowered in stages.

The phrase "surface that is substantially parallel to the working plane of the device for additive manufacturing" in the context of the present invention refers to a surface that does not deviate significantly from a theoretical plane parallel to the working plane. Advantageously, such a substantially parallel surface, obtained in step c), deviates at most 0.5 mm, more advantageously at most 0.2 mm, still more advantageously at most 0.1 mm, particularly advantageously at most 0.04 mm, from a theoretical plane parallel to the working plane which is arranged centrally between the highest point and lowest point of the corresponding surface that represents the surface to be processed in step f).

The term "working plane" in the context of the present invention refers to the theoretical plane in which a layer is built up in the device for additive manufacturing. For example, in the case of selective laser melting using a metal alloy powder, this is the plane of the coated-on metal alloy powder from which the corresponding layer of the component is built up.

The working data produced comprise data required for the device for additive manufacturing in order to generate a desired final form of the component. Here, the reference markings serve as reference points, in order that the device for additive manufacturing can carry out the necessary steps for building up the desired structures. This may take place in particular without measuring the component in the device for additive manufacturing.

In the case of further embodiments, the present invention relates to a method, wherein the working data are generated after step d) on the basis of the spatial arrangement of the surface to be processed with respect to the at least one reference marking, wherein the device for additive manufacturing controls the additive manufacturing of the structure on the basis of these working data in step f) in such a way that the structure adjoins the surface to be processed and is firmly connected to the component. The auxiliary plate serves as a basis, in order to be able to transfer the relations determined in the measuring device of the component and the reference marking with respect to one another into the device for additive manufacturing. At the same time, its precise fastening on the working plate in the device makes it possible that the reference markings lie at the assigned position within the device, and consequently the placement of the component is indirectly known because of the measuring data from step d). The evaluation of the measuring data and generation of the working data can in this case take place automatically. This is advantageous in particular if a greater number of components are to be processed in an automated manner.

It is typically advantageous that the working data also comprise the data of the structure to be manufactured. The compilation of the data required for the processing reduces for example the risk of mixups in the industrial processing of a large number of components.

Furthermore, it is advantageous to provide the auxiliary plate with a machine-readable identification such as a barcode. This allows measuring data to be assigned to the specific components and the risk of mixups to be virtually eliminated.

In the case of further embodiments, the present invention relates to a method, wherein, after step d), measured data of the component are compared with reference data of the component, deviations between the measured data of the component and the reference data of the component are determined, the necessity of an adaptation of reference data of the structure is determined and, if appropriate, on the basis of the deviations of the measured data of the component, the reference data of the structure are adapted and working data are produced with data of an adapted structure. Examples of reference data that can be used in this case are CAD data which for example represent the original CAD data of the component or CAD data which have been amended with reference to the structures to be applied. This has the advantage that deviations from the theoretical form of the component are thereby recorded and can be included in the processing. Thus, as a result, for example when there are deformations of the component, adaptations can be made in order to ensure a uniform surface profile of the finished component and for example to prevent undesired nominal geometrical deviations in the component.

In the case of further embodiments, the present invention relates to a method, wherein, in step e) the auxiliary plate is fastened at a predetermined position with predetermined alignment on the working plate. The possibility of fastening the auxiliary plate detachably at a predetermined position with predetermined alignment on the working plate creates an easy and nevertheless accurate possibility for transferring the data from the measurement in step d) to the reference system of the device for additive manufacturing. This makes it possible in particular to use existing devices for additive manufacturing without additional internal measuring technology, while high-precision structures can be applied on any desired components. In view of the prices of the devices and the flexibility of the possibility disclosed in the present invention, the efficiency of the use of existing installations can be drastically increased.

In the case of further embodiments, the present invention relates to a method, wherein the exact position and alignment of the auxiliary plate are determined by a detection method after fastening on the working plate. A determination of the exact position and alignment may also take place for example in that the position of various reference points of the auxiliary plate or also of the at least one reference marking is recorded. In addition or as an alternative, the position of a defined side of the auxiliary plate may for example be determined by means of a measuring device which functions in a way analogous to a dial gage, in particular a digital dial gage, or functions in a way analogous to a measuring sensor, digital or analog, or comprises a dial gage, advantageously a digital dial gage, and/or a measuring sensor, advantageously a digital measuring sensor. Here it is necessary that corresponding measuring technology is integrated internally in the device for additive manufacturing. Since, however, only for example few points of the defined auxiliary plate have to be determined, very simple measuring technology is sufficient for this, and the measurement can be carried out quickly. The actual highly accurate measurement of the exact position and/or form of the component is nevertheless relocated to step d), and consequently out of the device for additive manufacturing.

In the case of further embodiments, the present invention relates to a method, wherein the at least one reference marking on the auxiliary plate comprises fastened 3-dimensional bodies. Such reference markings can typically be measured in step d) very well by the customary measuring methods, and so advantageously also the position of at least one reference marking can at the same time be determined with respect to the position of the component. In this way it can be avoided that for example the position of a reference marking and of the component on the auxiliary plate are determined separately, after which the position of the component in relation to the reference marking is calculated indirectly from this. Rather, the exact position of a component in relation to at least one reference marking, which serves as a link with the reference system of the device for additive manufacturing, can be obtained directly.

To make the measuring easier and/or to increase the measuring accuracy, the use of 3-dimensional bodies, which have at least one edge, more advantageously 2 edges, is typically advantageous. For example, they are cylinders on the auxiliary plate with a circular base area, wherein the upper circular area provides an edge for making the measuring easier.

It is also typically advantageous if at least one 3-dimensional body is used as a reference marking, wherein the 3-dimensional body has a height of at least 0.5 cm, advantageously at least 1 cm.

In the case of further embodiments, the present invention relates to a method, wherein the at least one reference marking is measured by the same method as the component. An appropriate choice of the reference marking makes it possible that additional working steps are avoided. In particular, the transfer of the supported component into another measuring device requires additional time. It also eliminates the risk of an accident during the transfer between the measuring devices, whereby the position of the at least one component changes, and consequently has to be re-measured. Furthermore, it prevents the incorrect assignment of measuring data of different auxiliary plates.

Advantageously a component, optionally a number of components, and at least one reference marking are measured at the same time. Furthermore, for example first a measurement may be carried out, wherein the data of at least one component and at least one reference marking are obtained. Subsequently, for example in the case of a number of components on the auxiliary plate, also the relation of component to component may be measured, in order to obtain indirectly a reference to the at least one reference marking.

In the case of further embodiments, the present invention relates to a method, wherein the component is a component part of a turbine, more advantageously a gas turbine. Such components benefit particularly from the possibilities of the method according to the invention. For instance, in view of the flexible manufacturing possibilities, a wide variety of structures can be built up on existing components. This is particularly advantageous for turbine components, in particular gas turbine components, the price of which makes repair meaningful and in respect of which adaptations are to be carried out to further optimize the existing installation as part of an upgrade. Furthermore, this also allows additively manufactured structures to be applied directly onto new conventionally produced components, in order to be able to offer low-cost new components with additively manufactured component parts. It also makes possible the direct repair of additively manufactured components, which on the one hand are gaining greater importance in these areas and on the other hand are at least partially unable to be repaired by conventional methods.

Particularly advantageously, the at least one component is a blade, such as a moving blade or a stationary blade, or a heat shield, as is present in the blade region or in the region of the combustion chamber. The method has proven to be particularly advantageous for structures on blades. For example, in the case of structures at the ends of the blades, the respective component must in this case be clamped at the other end in a mounting, while so far it has at best been possible with great effort for the fastening to take place in a predefined highly accurate orientation.

In the case of further embodiments, the present invention relates to a method, wherein, in step b), at least two components, more advantageously at least four components, still more advantageously at least eight components, with in each case at least one surface to be processed, are fastened on the auxiliary plate. It has surprisingly been found that even a plurality of components can be applied on the auxiliary plate, while the measuring data offer sufficient information with respect to the processing. Although in corresponding measurements in step d) some of the components cover parts of other components, the remaining visible region of the components is sufficient in connection with the possibility of highly accurate measurements to obtain the required data for producing the working data. Furthermore, it is very much easier in a separate measuring installation for the position and distance of the measuring device from the component to be changed in order to ensure the obtainment of adequate measuring data. This is advantageous in particular for additive manufacturing methods that take place in a powder bed, such as selective laser melting. The possibility of being able to process a number of components at the same time leads to a drastic increase in efficiency.

The term "additive manufacturing" relates to the manufacturing methods commonly used by a person skilled in the art. This involves building up a component from formless substances, such as liquids, gels or powders, or form-neutral substances, such as substances in the form of a strip, wire or sheet, on the basis of a data model such as CAD data. Advantageously, this involves selecting formless or form-neutral substances from metals, metal alloys and ceramic materials, advantageously metals and metal alloys. A typically advantageous example of additive manufacturing methods are 3D printing methods.

Examples of these methods are selective laser melting (SLM), electron-beam melting (EBM), selective laser sintering (SLS) and binder jetting, from which in the case of a further embodiment the additive manufacturing method is advantageously selected. Particularly advantageous are selective laser melting, electron-beam melting and selective laser sintering, more advantageously selective laser melting and electron-beam melting. Such methods have proven to be particularly suitable for use in the method according to the invention. They allow for example flexible 3D structures to be built up on high-value components with high precision and great reliability.

For specific areas of use, in particular with a focus on particularly high temperature resistance, additive manufacturing methods such as selective laser sintering and binder jetting, in particular selective laser sintering, have proven to be advantageous in particular.

For further embodiments, binder jetting has proven to be advantageous in particular, if for example high numbers of items are to be processed at low costs.

In the case of further embodiments, the present invention relates to a method, wherein the structure is produced on the component from a metal, a metal alloy or a ceramic material, advantageously a metal or a metal alloy. Advantageously, a highly heat-resistant metal or a highly heat-resistant metal alloy, such as a nickel superalloy, is used. This is particularly advantageous because it allows for example highly loaded-bearing structures to be built up on components. For example in the case of turbine components, these are equivalent to the original material in terms of reliability and also allow a flexible upgrade of for example existing sets of turbine blades.

In the case of further embodiments, the present invention relates to a method, wherein the measuring in step d) takes place by means of an optical detection method, more advantageously with an optical 3D scanner, still more advantageously with a blue light scanner. Such systems are advantageously based on structured light projection, in order to determine the 3-dimensional recording of the surface of the scanned objects by means of image sequences. These methods are particularly advantageous because they allow the measurements in step d) to be carried out with very great accuracy and great speed. This is required in particular for maintenance work, in which for example complete sets of turbine blades of a gas turbine have to be refurbished within a small time window.

In the case of further embodiments, the present invention relates to a method, wherein the at least one reference marking is applied on the auxiliary plate at least partially by means of additive manufacturing. The at least partial application of the reference marking by means of additive manufacturing makes it possible in an easy way to bring the spatial reference system within the device for additive manufacturing into connection with the coordinate system of a measuring device used in step d).

In the case of further embodiments, it is advantageous that at least one reference marking is applied completely, more advantageously all of the reference markings are applied completely, by means of additive manufacturing and subsequently only an optional processing step involving removal of material takes place before the measuring in step d). Although this requires a greater amount of time in the device for additive manufacturing, it avoids for example an additional process step in which further material is applied on the basis of the position of partially applied reference markings. The aforementioned removal of material may for example take place by a cutting form of machining. This may in particular allow for example one or more edges to be produced.

Furthermore, an auxiliary plate prepared by means of additive manufacturing, comprising the required reference bodies, may be measured and serve as a basis for copies of this. In this case, auxiliary plates comprising identical reference markings at identical locations are produced highly accurately, for example by means of cutting machining methods. In the case of further embodiments, the application of the reference markings therefore takes place by means of additive manufacturing as stated above or they are produced outside a device for additive manufacturing as a copy of such an auxiliary plate with reference markings, wherein standard methods such as cutting-machining production steps are used. Standard methods refer to production methods known to a person skilled in the art that advantageously do not comprise selective laser melting, electron-beam melting or selective laser sintering. For example, a combination of at least one material-applying method, such as build-up welding, for example laser build-up welding, with at least one material-removing method, such as a cutting form of machining, may be used. This makes easy and quick preparation of the device-specific reference points possible without having to spend major amounts of operating time of the corresponding device for additive manufacturing on the production of the marked auxiliary plates.

In the case of further embodiments, it is advantageous that at least one reference point for the exact alignment of a subsequently built-up reference body is applied by means of additive manufacturing. This has the advantage that the time in which the auxiliary plate must be processed in the device for additive manufacturing, which is typically the time-limiting factor, is significantly reduced. Such a reference point may for example be provided on a blind body. The term "blind body" in the context of the present invention refers to a body which is fastened on the auxiliary plate at the intended location of the at least one reference marking and which has a greater spatial content than the subsequently required reference marking. The inaccurate placement and alignment of the reference body is subsequently corrected by removing material from the blind body, advantageously by a cutting form of machining, on the basis of the reference point applied by means of additive manufacturing, and so this results in the reference body having a defined placement, form and orientation on the auxiliary plate. In addition or as an alternative to this, it is also possible for a reference point to be produced on the auxiliary plate and at least one reference body to be built up spatially at a distance from it.

In the case of further embodiments, it is advantageous that, during step e), at least one centering element of the working plate is combined with a counterpart of the auxiliary plate or at least one centering element of the auxiliary plate is combined with a counterpart of the working plate. In this case, the centering element may for example be selected from known zero-point clamping systems. It advantageously comprises elements protruding out of the respective surface, which at least partially taper toward their end. The side remote from the plate having the centering element is regarded here as the end. For example, such a centering element advantageously has at its end a bevel or curvature, which, when connecting the working plate and the auxiliary plate, directs the auxiliary plate to the exact position. The counterpart of the other plate, respectively, takes the form here of an opening, into which the centering element engages and thereby sets a defined alignment. In particular, it is advantageous that the working plate has at least one such centering element.

In the case of further embodiments, the present invention relates to a method, wherein step a) comprises the following steps a1) fastening the auxiliary plate on the working plate of the device for additive manufacturing, and a2) applying at least one 3-dimensional body as a reference marking on the auxiliary plate by means of additive manufacturing.

According to a further aspect, the present invention relates to the aforementioned device for additive manufacturing comprising a working plate and an auxiliary plate for carrying out the method according to the invention In the case of further embodiments, it is advantageous that the working plate is detachably connected to the device for additive manufacturing. This makes it easier for it to be exchanged when the fastenings for the auxiliary plate are worn.

Alternatively, the working plate may also be fixedly installed in the device for additive manufacturing. Modification of a fixedly installed working plate does typically make the required times for maintenance much longer. However, in this way a still greater accuracy of the positioning of the working plate, and consequently of the auxiliary plate fastened on it, can typically be achieved.

Furthermore, the device for additive manufacturing advantageously comprises a component for powder conveyance, which is suitable for conveying a metal powder, metal alloy powder or ceramic material powder, advantageously metal powder or metal alloy powder, into the production area of the device for additive manufacturing.

Found to be advantageous in particular have been devices for additive manufacturing that have a component for generating and controlling a laser beam and/or electron beam, wherein the laser beam and/or electron beam is suitable for melting a metal powder or metal alloy powder for the additive manufacturing or for sintering a ceramic material powder, advantageously for melting a metal powder or metal alloy powder for the additive manufacturing.

According to a further aspect, the present invention relates to the aforementioned composite structure for use in a method according to the invention.

In the case of further embodiments, it is advantageous that the composite structure also has fastening elements for the component. This is advantageous in particular to make a stable connection to the auxiliary plate possible.

The invention is to be described more specifically in detail below on the basis of individual figures. It should be noted here that the figures are to be understood as merely schematic and that a lack of feasibility of the invention cannot be inferred from them. In particular, they should not be understood as a restriction of the invention, the scope of which is only specified by the claims.

It should also be noted that the technical features presented below are to be claimed in any combination with one another, as long as this combination can serve as a means for achieving the object of the invention.

FIG. 1 shows the detail of a schematic side view from a device 8 for additive manufacturing during step f) of the method. Selective laser melting is used here for the additive manufacturing. The composite structure 10 comprising an auxiliary plate 3, a reference marking 4 and a component 5 can be seen here. Used for fastening the component 5 on the auxiliary plate 3 are two fastening elements 6, which, in spite of the firtree serration at the lower end of the component 5, make a secure fastening possible in a defined position on the auxiliary plate 3. This allows the alignment of the component 5 such that the surface 1 to be processed is upwardly directed. In FIG. 1, the component 5 is a turbine blade, which represents a component part of a gas turbine.

The composite structure 10 was introduced into the device 8 for additive manufacturing after the measuring in step d), during step e), and was detachably fastened at a predetermined position and in predetermined alignment on the working plate 2. The working plate 2 is lowered in stages during the processing according to step f). After the respective lowering of the working plate 2 and the composite structure 10 connected thereto, a new powder layer may be applied, before a further layer of the structure is produced. In the case of this specific example, the powder of a nickel superalloy is used as the powder, in order to ensure a highly heat-resistant structure.

For controlling the device 8 for additive manufacturing, working data obtained from measuring data of step d) of the method are used. In this case, the device 8 for additive manufacturing is controlled in such a way that the additively manufactured structure adjoins the surface 1 to be processed and is firmly connected to it.

The visible reference marking 4 has the form of a cylinder with a circular base area, which is fastened on the auxiliary plate 3. Consequently, a 3-dimensional body serves as the reference marking 4. In FIG. 1, it is completely recessed in the powder bed 7, from which the structure is built up on the surface 1 to be processed of the component 5 in the device 8 for additive manufacturing.

Figure 2:
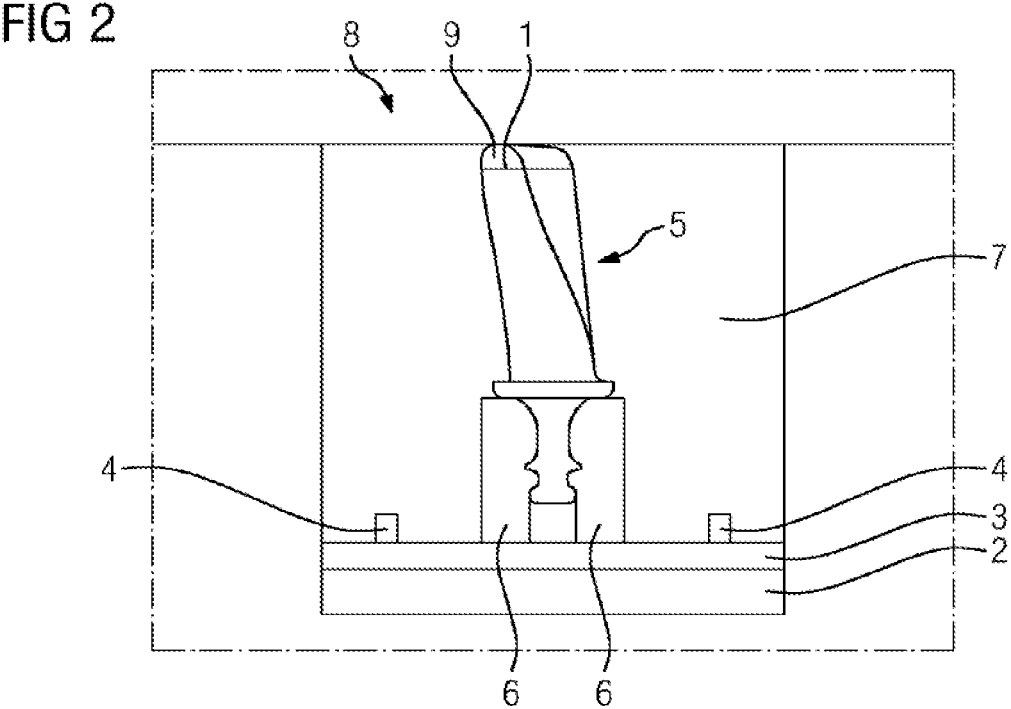
FIG. 2 shows the detail of a schematic side view from a device for additive manufacturing during a later point in time of step f) of the method.

FIG. 2, like FIG. 1, shows the detail of a schematic side view of a device 8 for additive manufacturing in the method already represented in FIG. 1. However, FIG. 2 shows a later point in time, at which the structure 9 has already been built up on the surface 1 to be processed.

Figure 3:
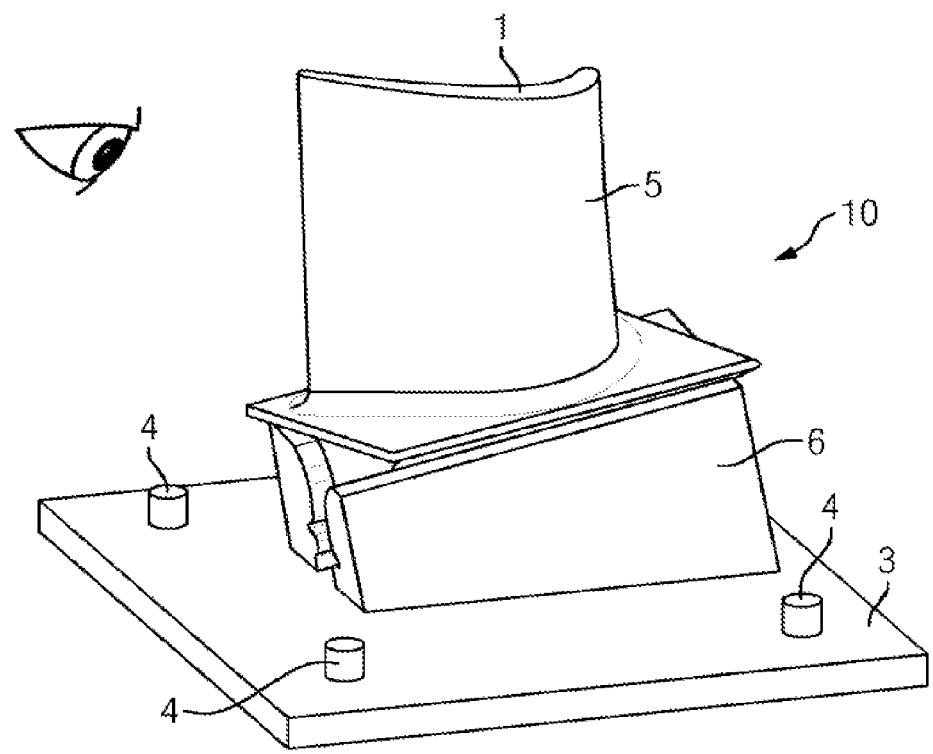
FIG. 3 shows a schematic representation from step d) of the method already represented in FIG. 1.

FIG. 3 shows a schematic representation from step d) of the method already represented in FIG. 1 with the composite structure 10 shown therein. On account of the perspective view of the composite structure 10, three reference markings 4 are visible in FIG. 2. The component 5 is fastened on the auxiliary plate 3 by means of two fastening elements 6. As already shown in FIG. 1, the surface 1 to be processed is upwardly directed. The three visible reference markings 4 are cylinders with a circular base area, and consequently 3-dimensional bodies, which are fastened on the auxiliary plate 3. The stylized eye represents the optical measuring device, in this case a blue light scanner.

The composite structure 10 is measured by means of an optical detection method, which in the present case is a blue light scanner, which records the form and position of the component 5 and of the reference bodies by means of structured light. In this case, the reference markings 4 and the component 5 are measured by the same method.

In this case, the measuring data obtained are used to determine the form of the component 5 and subsequently compare it with reference data. On this basis, if appropriate, an adaptation of the data of the structure 9 to be additively built up takes place, while the adapted data are passed on to the device 8 as working data.

In addition, the exact spatial arrangement of the surface 1 to be processed with respect to at least one of the reference markings 4 is recorded. Subsequently, these measuring data make the exactly controlled approach of the surface 1 to be processed of the component 5 possible in the device 8 without the latter having to have its own internal measuring technology. In this case, the position and alignment of the surface 1 to be processed are determined indirectly in the device 8 from the known position of the reference marking 4 in the device 8 and the aforementioned spatial arrangement of the reference marking 4 and the surface 1 to be processed. As soon as the auxiliary plate 3 is consequently detachably fastened on the working plate 2 at a predetermined position with predetermined alignment, the structure 9 can be built up by means of additive manufacturing, wherein the structure 9 adjoins the surface 1 to be processed and is firmly connected to the component 5.

Figure 4:
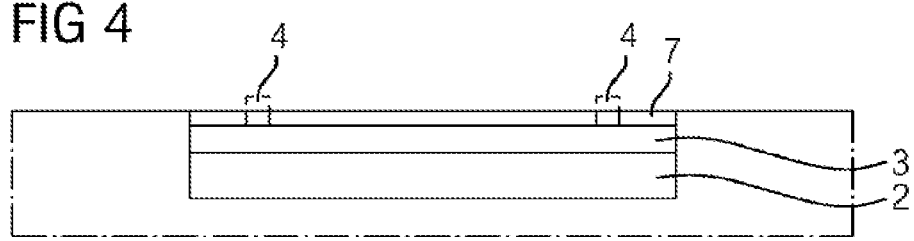
FIG. 4 shows the manufacturing of an auxiliary plate 3 in the device 8 for additive manufacturing that is also represented in FIG. 1.

FIG. 4 shows the production of an auxiliary plate 3 in the device 8 for additive manufacturing, which is also represented in FIG. 1. Part of two reference markings 4 has already been built up here. The auxiliary plate 3 is detachably fastened at a predetermined position with predetermined alignment on the working plate 2. Since the reference marking 4 is additively manufactured in the specific device at a specified location, the control data of the device 8 contain for the production of the auxiliary plate 3 with the reference marking 4 a reference possibility between subsequent measurements, as in step d), and the reference system of the control of the device 8. It can in this way be determined indirectly which location within the device 8 must be approached, as long as the position in relation to the reference marking 4 is known. The auxiliary plate 3 produced in FIG. 4 is subsequently used directly in the method of FIGS. 1 and 2. As an alternative to this, as stated for example in the description, this auxiliary plate 3 may however also for example be reproduced by means of conventional methods such as cutting-machining working steps outside the device 8.

FIG. 5 shows a schematic sequence of the method that is also represented in FIGS. 1 and 2. This involves running through steps a) to f). The method may in this case be performed either i) with step c) or ii) without step c).

In step d), measuring data with respect to the component and at least one reference marking are obtained. These are used to produce working data for the control of the device. Also used for controlling the device is the information of the known position of the at least one reference marking in the device for additive manufacturing with a known position and alignment of the auxiliary plate in the device. Advantageously, the information of the known position of the at least one reference marking in the device for additive manufacturing is used directly, in order together with the measuring data from step d) to generate a set of data for controlling the device. This allows the typically lower computing capacity of a control device of a device for additive manufacturing to be avoided as a limiting factor.

The invention claimed is:

1. A method for additive manufacturing of a structure on at least one surface to be built-up by additive manufacturing processed of a component in a device for additive manufacturing, wherein the device for additive manufacturing has a working plate, the method comprising:
   a) preparing an auxiliary plate suitable for fastening on the working plate, wherein the auxiliary plate has at least one reference marking that is not located within the at least one surface of the component,
   b) fastening the component on the auxiliary plate,
   c) optionally processing the at least one surface to be built-up by additive manufacturing for providing a surface that is substantially parallel to a working plane of the device for additive manufacturing,
   d) measuring the at least one reference marking and the component, wherein a position of the component with reference to the at least one reference marking is recorded as working data,
   e) introducing the auxiliary plate with the at least one reference marking and the component into the device for additive manufacturing and detachably fastening the auxiliary plate on the working plate and f) building up by additive manufacturing of the structure on the at least one surface of the component in the device for additive manufacturing as defined by the position recorded in the working data.

2. The method as claimed in claim 1, wherein the working data are generated after step d) on the basis of a spatial arrangement of the surface to be built-up by additive manufacturing with respect to the at least one reference marking, wherein the device for additive manufacturing controls the additive manufacturing of the structure on the basis of these working data in step f) in such a way that the structure adjoins the surface to be built-up by additive manufacturing and is firmly connected to the component.

3. The method as claimed in claim 1, wherein, after step d), measured data of the component are compared with reference data of a reference component, deviations between the measured data of the component and the reference data of the reference component are determined, a necessity of an adaptation of reference data of the structure is determined, and when appropriate, on the basis of the deviations between the measured data of the component and reference data of the reference component, the reference data of the structure are adapted and the working data are produced with data of an adapted structure.

4. The method as claimed in claim 1, wherein, in step e), the auxiliary plate is fastened at a predetermined position with predetermined alignment on the working plate.

5. The method as claimed in claim 1, wherein the exact position and alignment of the auxiliary plate is determined by a detection method after fastening on the working plate.

6. The method as claimed in claim 1, wherein the at least one reference marking on the auxiliary plate comprises fastened 3-dimensional bodies.

7. The method as claimed in claim 1, wherein the at least one reference marking is measured by the same method as the component.

8. The method as claimed in claim 1, wherein the component is a component part of a turbine.

9. The method as claimed in claim 1, wherein, in step b), at least two components, with in each case at least one surface to be processed, are fastened on the auxiliary plate.

10. The method as claimed in claim 1, wherein the additive manufacturing method is selected from the group consisting of selective laser melting, electron-beam melting, selective laser sintering and binder jetting.

11. The method as claimed in claim 1, wherein the structure is produced on the component from a metal, a metal alloy or a ceramic material.

12. The method as claimed in claim 1, wherein the measuring in step d) takes place by means of an optical detection method.

13. The method as claimed in claim 1, wherein step a) comprises: a1) fastening the auxiliary plate on the working plate of the device for additive manufacturing, and a2) applying at least one 3-dimensional body as a reference marking on the auxiliary plate by means of additive manufacturing.

* * * * *